(12) United States Patent
Osborne et al.

(10) Patent No.: US 8,284,558 B2
(45) Date of Patent: Oct. 9, 2012

(54) APPARATUS AND METHOD FOR USE IN ASSEMBLY OF A PORTABLE APPARATUS

(75) Inventors: Gareth Osborne, Hampshire (GB);
Esa-Sakari Maatta, Hampshire (GB);
Hutch Hutchison, Surrey (GB)

(73) Assignee: Nokia Corporation, Espoo (FI)

( * ) Notice: Subject to any disclaimer, the term of this patent is extended or adjusted under 35 U.S.C. 154(b) by 700 days.

(21) Appl. No.: 12/316,602

(22) Filed: Dec. 15, 2008

(65) Prior Publication Data
US 2010/0149761 A1 Jun. 17, 2010

(51) Int. Cl.
*H05K 5/00* (2006.01)
(52) U.S. Cl. .................... 361/752; 361/807; 361/810
(58) Field of Classification Search ......... 312/223.1, 312/223.2; 361/728, 730, 752, 796, 797, 361/800, 807, 810, 801
See application file for complete search history.

(56) References Cited

U.S. PATENT DOCUMENTS

| 4,468,718 | A  | * | 8/1984  | Main ................... 361/757 |
| 5,081,551 | A  | * | 1/1992  | Aruga ................ 360/97.01 |
| 5,369,549 | A  | * | 11/1994 | Kopp et al. .......... 312/263 |
| 6,542,206 | B1 | * | 4/2003  | Saito ..................... 349/58 |
| 6,567,275 | B1 | * | 5/2003  | Hou et al. ............ 361/807 |
| 6,594,472 | B1 |   | 7/2003  | Curtis et al. ........... 455/90 |
| 6,930,734 | B2 | * | 8/2005  | Lee ...................... 349/58 |
| 7,301,590 | B2 | * | 11/2007 | Lee ...................... 349/58 |
| 7,576,990 | B2 | * | 8/2009  | Ni et al. .............. 361/737 |
| 7,742,316 | B2 | * | 6/2010  | Ho et al. ............. 361/818 |

OTHER PUBLICATIONS

Photograph of Vertu "Ascent Ti" telephone, Nokia Corporation, 2008, showing location of screws, 1 page.
Photograph of Nokia "6220 Classic" telephone, Nokia Corporation, 2008, showing location of screws under the Keypad, 1 page.

* cited by examiner

*Primary Examiner* — Hung S Bui
(74) *Attorney, Agent, or Firm* — Harrington & Smith (57) ABSTRACT

An apparatus including: a first interconnector portion configured to fasten to a side part of a first housing portion of a portable apparatus, and a second interconnector portion rigidly connected to the first interconnector portion and configured to fasten to a second housing portion of the portable apparatus.

21 Claims, 7 Drawing Sheets

APPARATUS AND METHOD FOR USE IN ASSEMBLY OF A PORTABLE APPARATUS

FIELD OF THE INVENTION

Embodiments of the present invention relate to an apparatus and a method for use in assembly of a portable apparatus. In particular, they relate to an apparatus and method for use in assembly of a mobile cellular telephone.

BACKGROUND TO THE INVENTION

Portable apparatus such as mobile cellular telephones usually include a plurality of housing portions that define the exterior of the portable apparatus and thereby provide a cover. The housing portions usually house the electronic components of the portable apparatus and may provide some protection from the environment (for example, rain) and from accidental damage (for example, being dropped by a user of the portable apparatus).

The housing portions are usually fastened to one another via screws. For example, screws may be inserted through apertures in one housing portion and engage a screw aperture in another housing portion. In order to obtain secure fastening of housing portions, apertures may be provided through internal structures within the portable apparatus (for example, the keypad frame). However, this may result in the internal structures becoming mechanically weaker and easier to damage. Alternatively, the housing portions may be increased in size so that the screws may be inserted in locations that are free from internal structures. However, this may result in the portable apparatus becoming undesirably large.

It would therefore be desirable to provide an alternative apparatus and method for use in assembly of a portable apparatus.

BRIEF DESCRIPTION OF VARIOUS EMBODIMENTS OF THE INVENTION

According to various, but not necessarily all, embodiments of the invention there is provided an apparatus comprising: a first interconnector portion configured to fasten to a side part of a first housing portion of a portable apparatus, and a second interconnector portion rigidly connected to the first interconnector portion and configured to fasten to a second housing portion of the portable apparatus.

The apparatus may be for use in assembly of a portable apparatus.

According to various, but not necessarily all, embodiments of the invention there is provided an apparatus comprising: means for fastening to a side part of a first housing portion of a portable apparatus, and means for fastening to a second housing portion of the portable apparatus, the means for fastening to the first housing portion being rigidly connected to the means for fastening to the second housing portion.

According to various, but not necessarily all, embodiments of the invention there is provided a portable apparatus comprising the apparatus described in the preceding paragraphs.

According to various, but not necessarily all, embodiments of the invention there is provided a method comprising: fastening a first interconnector portion to a side part of a first housing portion of a portable apparatus, and fastening a second interconnector portion, rigidly connected to the first interconnector portion, to a second housing portion of the portable apparatus.

The method may be for use in assembly of a portable apparatus.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

FIGS. 1 to 5 illustrate an apparatus 10 comprising: a first interconnector portion 28 configured to fasten to a side part 20 of a first housing portion 12 of a portable apparatus, and a second interconnector portion 30 rigidly connected to the first interconnector portion 28 and configured to fasten to a second housing portion 14 of the portable apparatus.

Figure 1:
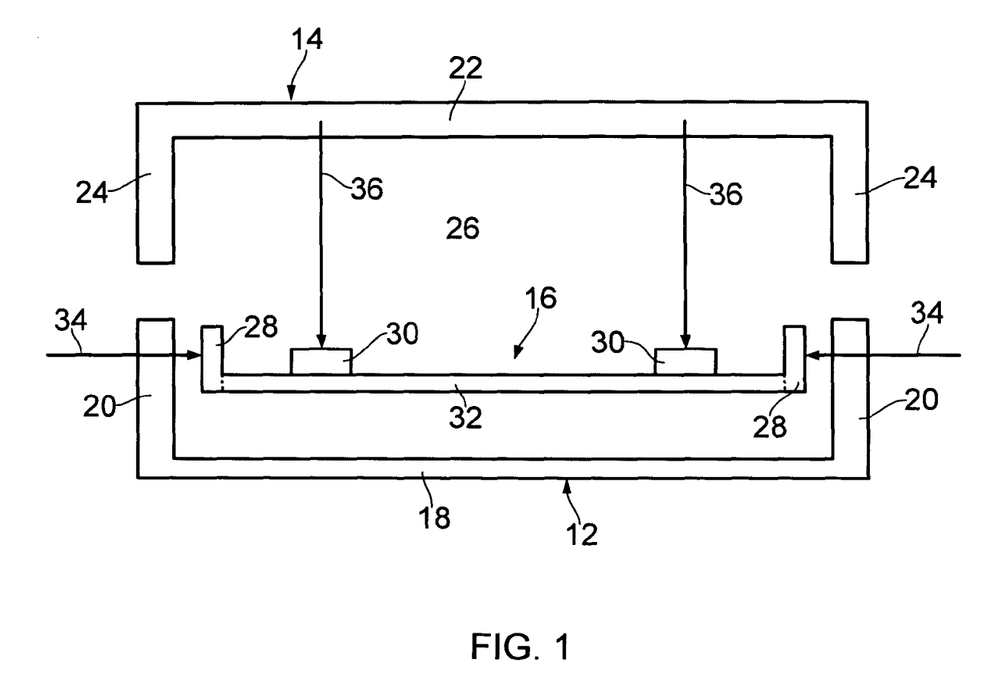
FIG. 1 illustrates a schematic cross sectional side view of an apparatus according to various embodiments of the present invention.

In more detail, FIG. 1 illustrates a schematic cross sectional side view of an apparatus 10 including a first housing portion 12, a second housing portion 14 and an interconnector 16. The apparatus 10 may be any portable apparatus and may be, for example, a portable electronic communication device, a mobile cellular telephone, a personal digital assistant (PDA) or a palm top computer. A portable apparatus is any apparatus that may be comfortably handled and operated by a user with one or two hands.

In the following description, the wording 'connect' and 'couple' and their derivatives mean operationally connected/coupled. It should be appreciated that any number or combination of intervening components can exist (including no intervening components).

The first housing portion 12 and the second housing portion 14 may function as a cover for the apparatus 10 and thereby define the exterior surface of the apparatus 10. The first housing portion 12 includes a front part 18 and side parts 20. The front part 18 includes one or more apertures for user input/output devices (for example, a display, a microphone, a loudspeaker, a keypad) and the side parts 20 extend substantially perpendicularly from the perimeter of the front part 18. The second housing portion 14 includes a rear part 22 and side parts 24 that extend substantially perpendicularly from the perimeter of the rear part 22.

The first and second housing portions 12, 14 may comprise any suitable material and may comprise metal and/or plastic. The first and second housing portions 12, 14 may be coated in a protective material. For example, when the first and second housing portions 12, 14 comprise metal, they may be coated with a plastic layer that protects the metal from damage and rust.

The first housing portion 12 and the second housing portion 14 define a cavity 26 and may house electronic components of the portable apparatus 10 within the cavity 26. For example, the first and second housing portions 12, 14 may house a processor and a memory that are mounted on, and connected via a printed circuit board (not illustrated in this figure).

The interconnector 16 includes at least one first interconnector portion 28 and at least one second interconnector portion 30 that are rigidly connected to one another (via a third interconnector portion 32 for example) and are configured to fasten the first and second housing portions 12, 14 together. The interconnector 16 may comprise any suitable material(s) and may comprise metal for example. The various configurations of the first and second interconnector portions 28, 30 are described in more detail with reference to FIGS. 3 to 6 in the following paragraphs. However, it should be appreciated that the first and second interconnector portions 28, 30 may be configured to receive a fastener (a screw for example) for fastening to the first and second housing portions 12, 14 respectively. Additionally, it should be appreciated that the interconnector 16 may not in itself house any electronic components of the portable apparatus.

In this embodiment, the interconnector 16 is positioned wholly within the cavity 26 defined by the first and second housing portions 12, 14. In other embodiments, the interconnector 16 may be positioned partially within the cavity 26. For example, the interconnector 16 may be positioned so that the first interconnector portion 28 is external to the cavity 26 and so that the second interconnector portion 30 is within the cavity 26. Such an embodiment is described in the following paragraphs with reference to FIG. 6.

In various embodiments, the interconnector 16 is solely configured to fasten the first and second housing portions 12, 14 together. For example, the interconnector 16 may be a frame that is provided solely for fastening the first and second housing portions 12, 14 together. In other embodiments, the interconnector 16 is configured to provide a function in addition to being configured to fasten the first and second housing portions 12, 14 together. For example, the interconnector 16 may be a keypad frame that is configured to support the keypad and may also be configured to fasten the first and second housing portions 12, 14 together.

The one or more first interconnector portions 28 are configured to fasten to the side parts 20 of the first housing portion 12. The vector of the fastening force 34 provided by the one or more first interconnector portions 28 is substantially perpendicular to the side parts 20 of the first housing portion 12. The one or more second interconnector portions 30 are configured to fasten to the second housing portion 14. The vector of the fastening force 36 provided by the one or more second interconnector portions 30 is substantially perpendicular to the rear part 22 of the second housing portion 14. Consequently, the vectors of the fastening forces provided by the first and second interconnector portions 28 are substantially orthogonal to one another.

Figure 2:
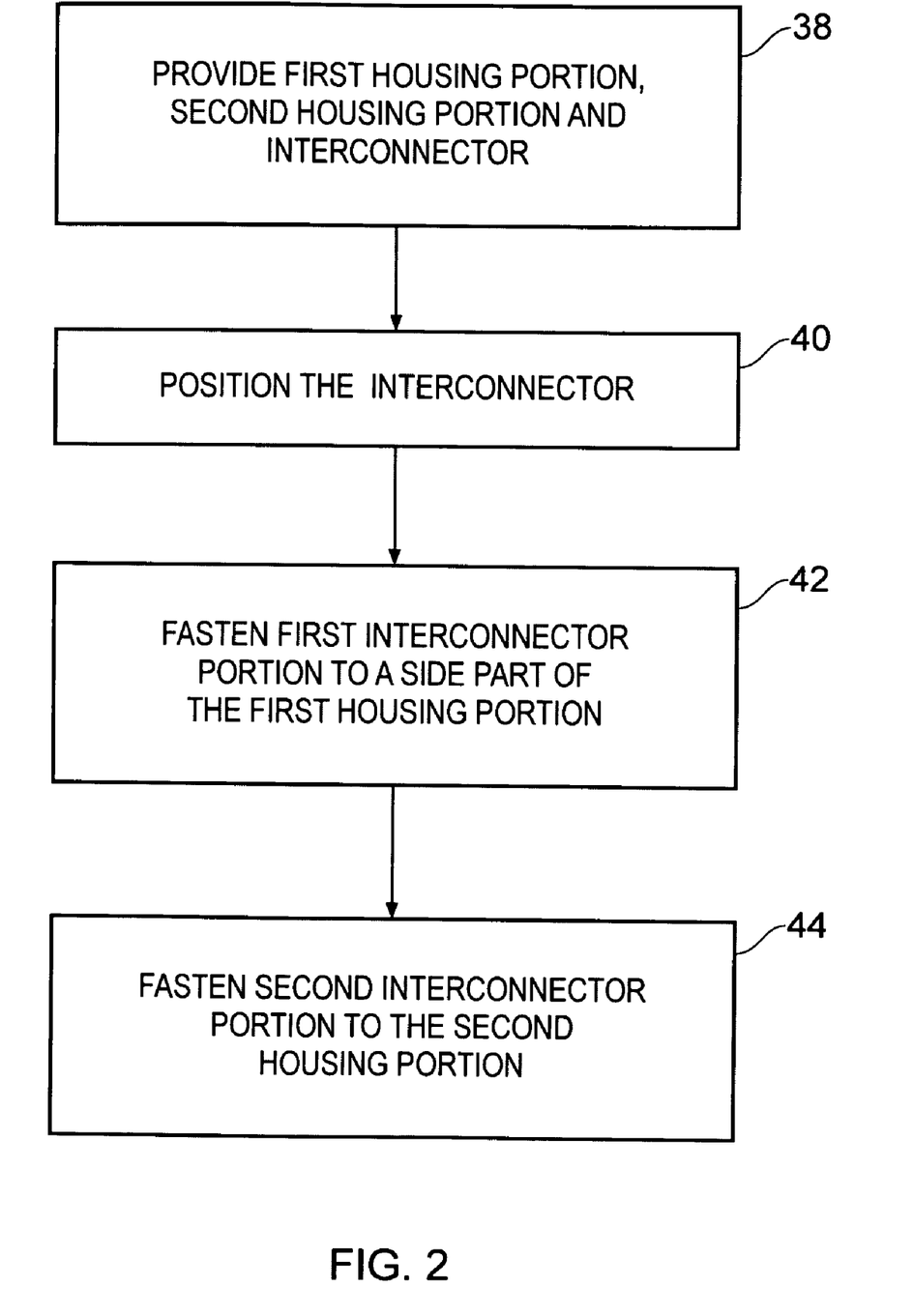
FIG. 2 illustrates a flow diagram of a method of assembling a portable apparatus according to various embodiments of the present invention.

A method for assembling an apparatus 10 according to various embodiments of the present invention is described in the following paragraphs with reference to FIGS. 1 and 2.

At block 38, the method includes providing the first housing portion 12, the second housing portion 14 and the interconnector 16. At block 40, the method includes positioning and orienting the interconnector 16 within the first housing portion 12 for fastening thereto. At block 42, the method includes fastening one or more first interconnector portions 28 to the side parts 20 of the first housing portion 12. At block 44, the method includes fastening one or more second interconnector portions 30 to the second housing portion 14.

The above described method of assembly may provide a portable apparatus 10 that has a substantially rigid cover formed from the first housing portion 12 and the second housing portion 14. Blocks 42 and 44 may be performed using specialist manufacturing tools that are only accessible to the manufacturer. Consequently, the user of the portable apparatus may not be able to disassemble and assemble the portable apparatus.

The illustration of a particular order to the above blocks does not necessarily imply that there is a required or preferred order for the blocks and the order and arrangement of the block may be varied. Furthermore, it may be possible for some blocks to be omitted.

Embodiments of the present invention may provide an advantage in that the first and second housing portions 12, 14 are fastened to one another via the interconnector 16. Consequently, any structures (for example, a keypad frame) which are positioned between the interconnector 16 and the front part 18 may not require any apertures for fasteners (such as screws). Therefore, embodiments of the present invention may provide a portable apparatus that has relatively rigid internal structures and is relatively narrow in comparison with other portable apparatus.

Figure 3:
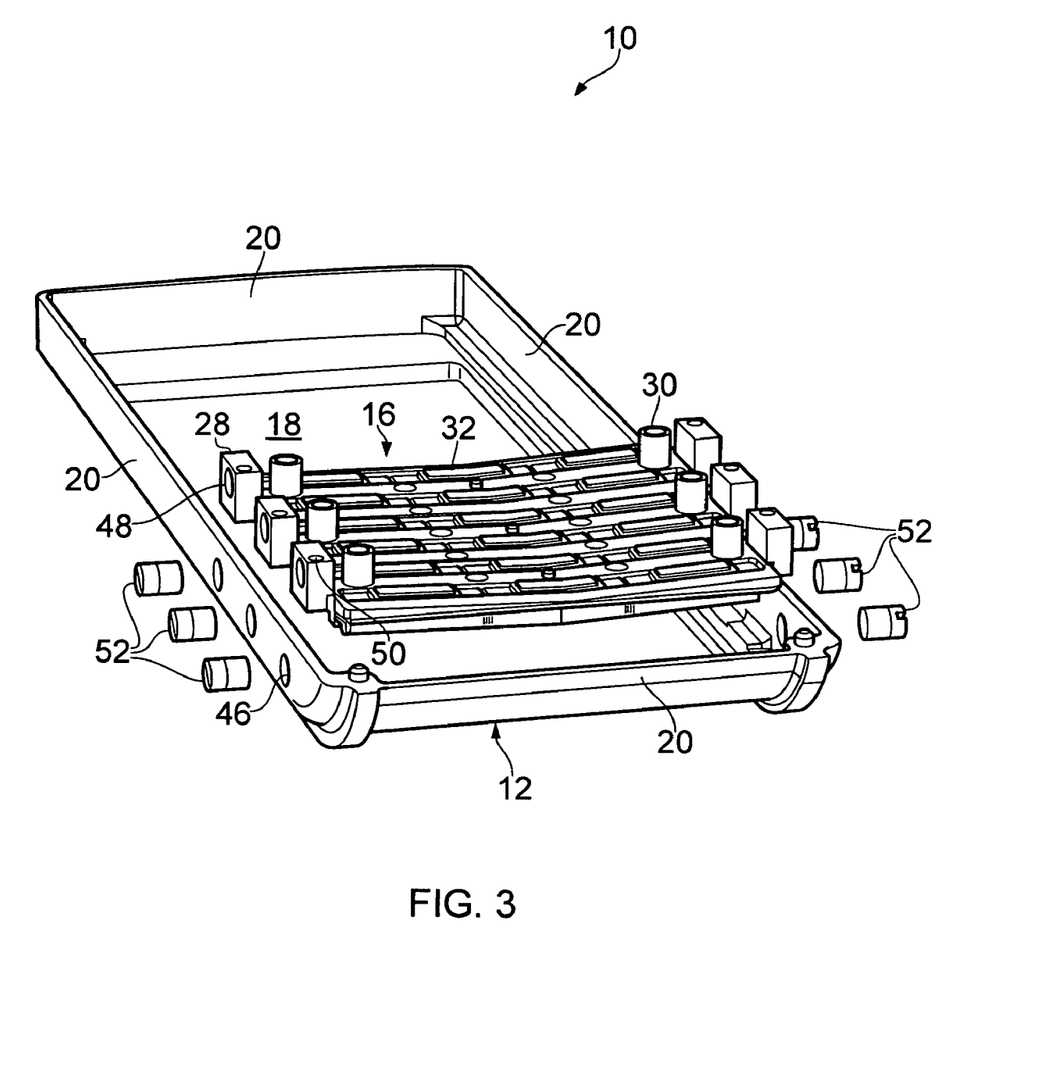
FIG. 3 illustrates a perspective view of another apparatus according to various embodiments of the present invention.
Figure 3A:
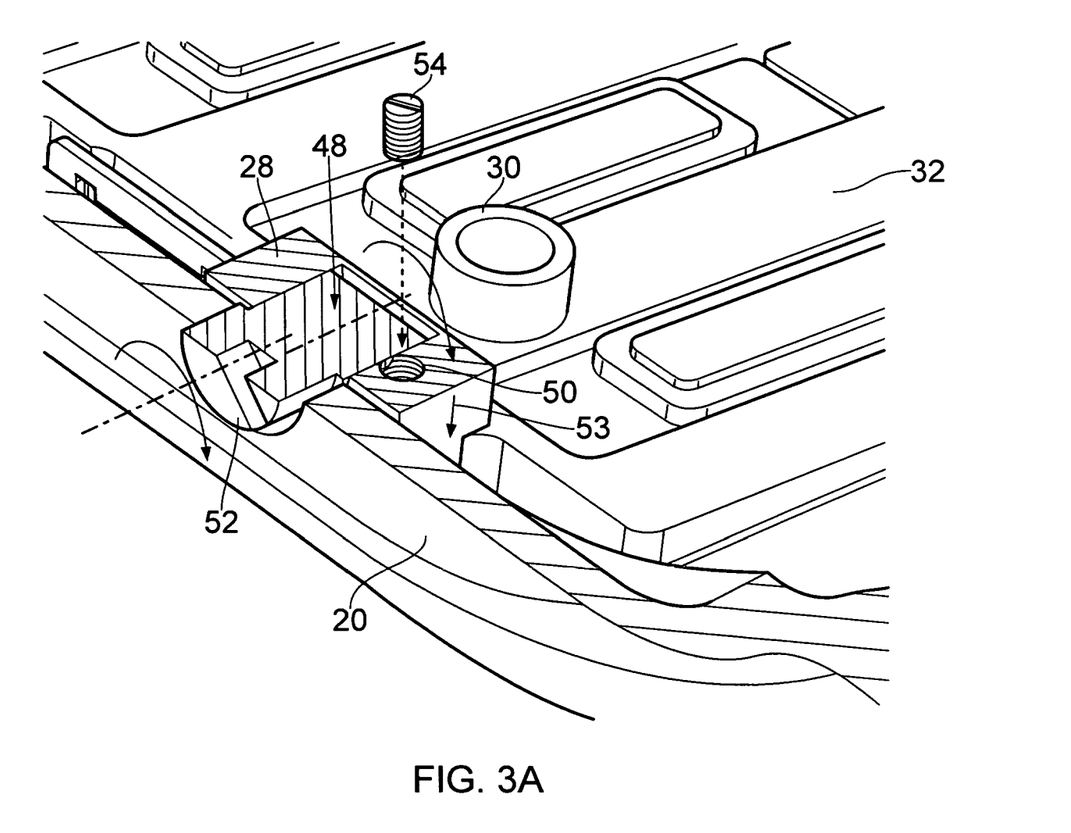
FIG. 3A illustrates a close up perspective view of the apparatus illustrated in FIG. 3.

FIGS. 3 and 3A illustrate a perspective view of another apparatus 10 according to various embodiments of the present invention. The apparatus 10 illustrated in FIGS. 3 and 3A is similar to the apparatus illustrated in FIG. 1 and where the features are similar, the same reference numerals are used.

In this embodiment, the interconnector 16 comprises a substantially planar keypad frame 32 that rigidly connects cam receiving members 28 (the first interconnector portions) and screw receiving members 30 (the second interconnector portions). The cam receiving members 28 include an aperture 48 for receiving a cam and an aperture 50 for receiving a fastener (a grub screw for example) for fixing a cam in place in the cam aperture 48. The keypad frame 32 is substantially rectangular and the cam receiving members 28 are positioned around the perimeter of the keypad frame 32 along the two short edges. The screw receiving members 30 are positioned adjacent the cam receiving members 28.

The side parts 20 of the first housing portion 12 include cam receiving apertures 46. In assembly of the apparatus 10, the interconnector 16 is positioned within the first housing portion 12 so that the cam receiving apertures 46 of the side parts 20 are lined up with the cam receiving members 28. Cams 52 are then inserted through the cam receiving apertures 46 of the side parts 20 and into the apertures 48 of the cam receiving members 28. As illustrated in FIG. 3A, the cams 52 are rotated about their axis in order to move the interconnector 16 in the direction of arrow 53 towards the front part 18 and to fasten the first housing portion 12 and the interconnector 16 together. The cams 52 are then fixed in place by the grub screw 54.

Figure 4:
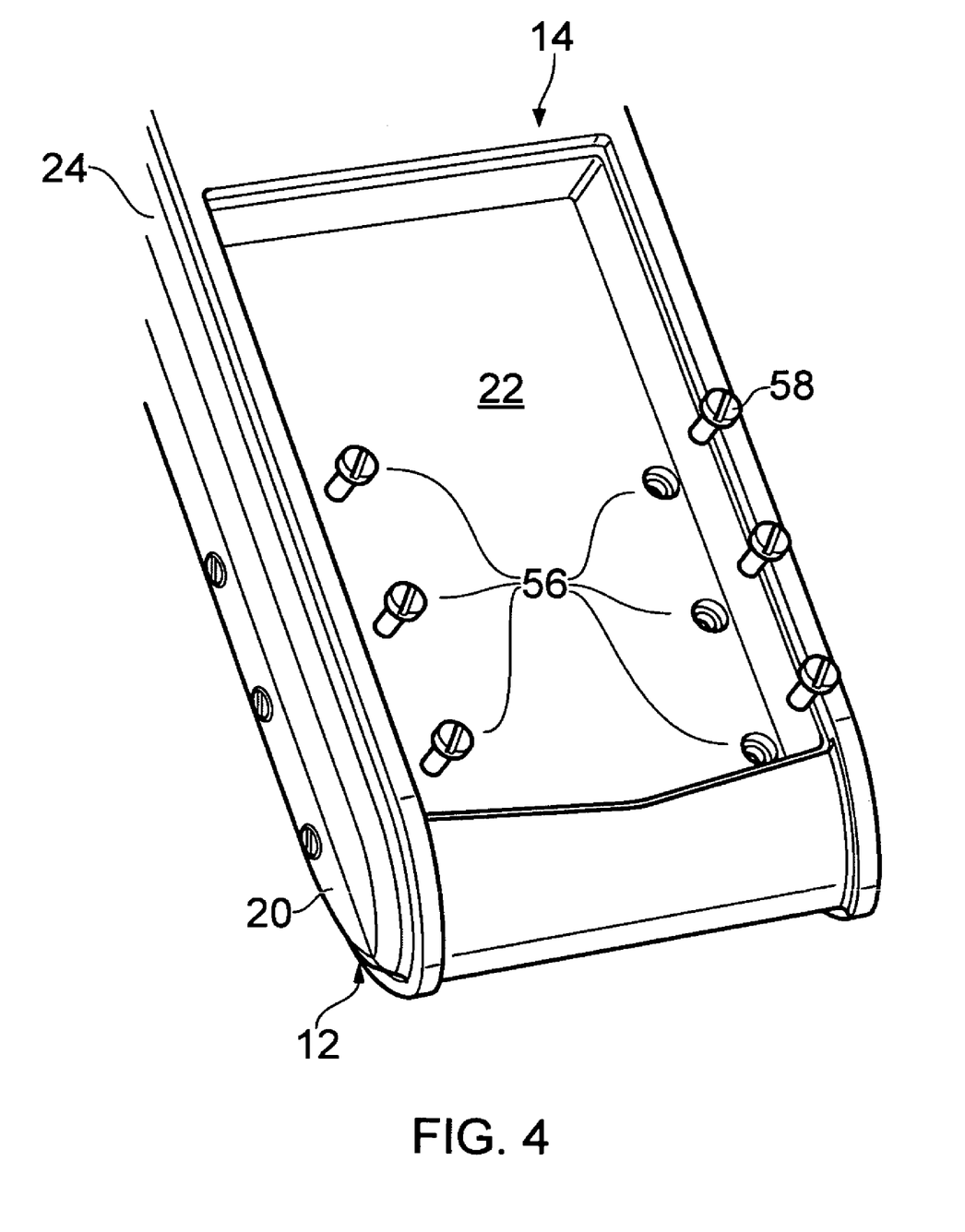
FIG. 4 illustrates a rear perspective view of an apparatus according to various embodiments of the present invention.

With reference to FIGS. 3 and 4, the second housing portion 14 is positioned on the first housing portion 12 so that the side parts 24 of the second housing portion 14 abut the side parts 20 of the first housing portion 12. The rear part 22 of the second housing portion 14 includes a plurality of apertures 56 and in assembly, screws 58 are inserted into the apertures 56 and fastened to the screw receiving members 30 of the interconnector 16.

Figure 5:
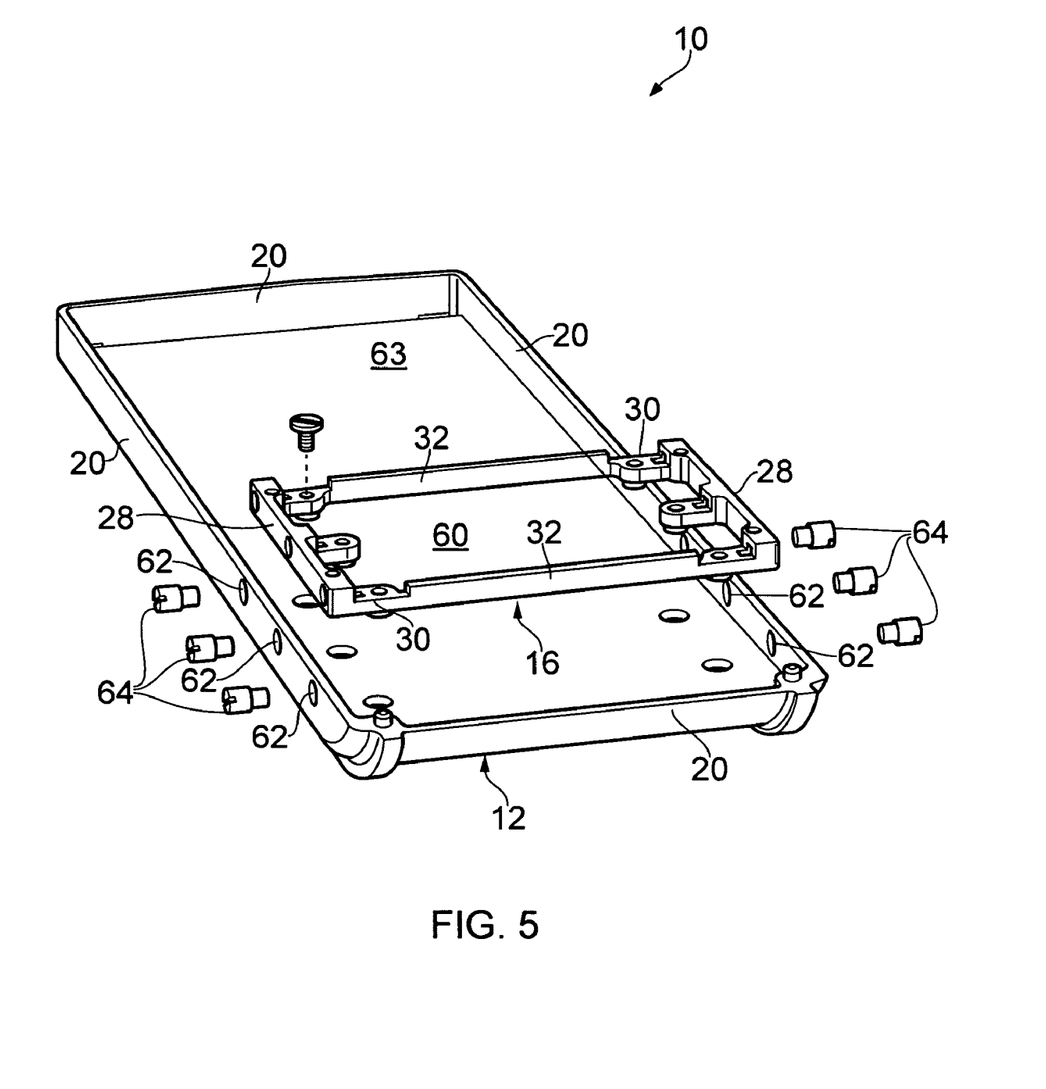
FIG. 5 illustrates a perspective view of another apparatus according to various embodiments of the present invention.

FIG. 5 illustrates a perspective view of a further apparatus 10 according to various embodiments of the present invention. The apparatus 10 illustrated in FIG. 5 is similar to the apparatus illustrated in FIGS. 1, 3 & 3A and where the features are similar, the same reference numerals are used.

In this embodiment, the interconnector 16 comprises a substantially planar frame that is solely provided for fastening the first and second housing portions 12, 14 together. The frame 16 is substantially rectangular and defines a substantially rectangular aperture 60. The frame 16 includes screw receiving members 28 (the first interconnector portions) that provide the two short edges of the frame 16 and include a plurality of apertures for receiving screws. The frame 16 also includes screw receiving members 30 (the second interconnector portions) that are positioned adjacent the screw receiving members 28. The screw receiving members 28, 30 are rigidly connected to one another via frame portions 32 which provide the long edges of the frame 16.

The side parts 20 of the first housing portion 12 include screw receiving apertures 62. In assembly of the apparatus 10, the frame 16 is positioned within the first housing portion 12 so that it is adjacent a printed circuit board 63 housed with the first housing portion 12 and so that the screw receiving apertures 62 of the side parts 20 are lined up with the apertures of the screw receiving members 28. Additionally, the frame 16 is oriented substantially parallel with the printed circuit board 63. Screws 64 are then inserted through the apertures 62 of the side parts 20 and into the screw receiving members 28. The screws 64 are then rotated in order to fasten the first housing portion 12 and the frame 16 together. The second housing portion 14 may then be fastened to the frame 16 as described above with reference to FIG. 4.

The embodiment illustrated in FIG. 5 may provide an advantage in that it does not require the keypad frame (or any other existing internal structure that may function as an interconnector) to be rigid since the interconnector 16 is provided by a dedicated frame. This may provide the portable apparatus manufacturer with greater design freedom in selecting materials for the keypad frame (or any other existing internal structure that may function as an interconnector). Additionally, since the interconnector 16 is separate to the keypad frame, the positioning of the second interconnector portion(s) 30 does not affect the layout of the keypad of the portable apparatus.

Figure 6:
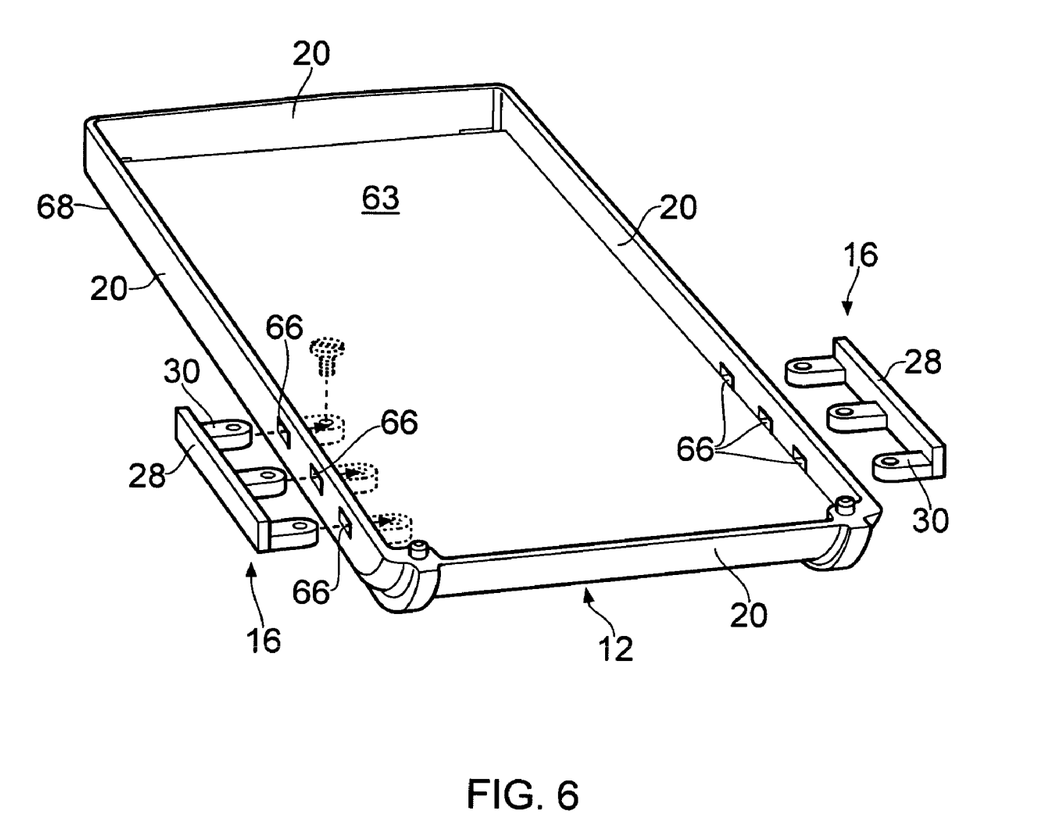
FIG. 6 illustrates a perspective view of a further apparatus according to various embodiments of the present invention.

FIG. 6 illustrates a perspective view of another apparatus 10 according to various embodiments of the present invention. The apparatus 10 illustrated in FIG. 6 is similar to the apparatus illustrated in FIGS. 1, 3, 3A and 5 and where the features are similar, the same reference numerals are used.

In this embodiment, the apparatus 10 includes two interconnectors 16 that each include a bracket 28 (the first interconnector portion) and three screw receiving members 30 (second interconnector portions) that extend perpendicularly from the bracket 28. It should be appreciated that in other embodiments, the apparatus 10 may include any number of interconnectors 16 and each interconnector 16 may include one or more screw receiving members 30.

The side parts 20 of the first housing portion 12 include apertures 66. In assembly of the apparatus 10, the screw receiving members 30 are inserted into the apertures 66 until the brackets 28 abut an exterior surface 68 of the side parts 20. The screw receiving members 30 are thereby positioned within the first housing portion 12 so that they are adjacent a printed circuit board 63 housed within the first housing portion 12. The second housing portion 14 may then be fastened to the frame 16 as described above with reference to FIG. 4.

It should be understood that in this embodiment the brackets 28 fasten to the side parts 20 of the first housing portion 12 through their abutment with the exterior surface 68 of the side parts 20. Additionally, screws (not illustrated) may be used to secure the brackets 28 to the side parts 20 the first housing portion 12.

As with the embodiment illustrated in FIG. 5, the embodiment illustrated in FIG. 6 may provide an advantage in that it does not require the keypad frame (or any other existing internal structure that may function as an interconnector) to be rigid since the interconnectors 16 are provided by a dedicated bracket 28 and one or more screw receiving members 30. Once again, this may provide the portable apparatus manufacturer with greater design freedom in selecting materials for the keypad frame (or any other existing internal structure that may function as an interconnector). Additionally, since the interconnectors 16 are separate to the keypad frame, the positioning of the second interconnector portion(s) 30 do not affect the layout of the keypad of the portable apparatus.

Since the screw receiving members 30 are positioned between the printed circuit board 63 and the rear part 22 of the second housing portion 14, the printed circuit board 63 does not include any apertures for receiving the screws 58. This may advantageously result in a printed circuit board 63 having a greater useable surface area.

Although embodiments of the present invention have been described in the preceding paragraphs with reference to various examples, it should be appreciated that modifications to the examples given can be made without departing from the scope of the invention as claimed. For example, the first interconnector portion 28 may be a fastener receiving member and the second interconnector portion 30 may be a bracket. Furthermore, the interconnector 16 may have any shape.

The portable apparatus 10 may be configured it receive a battery on the exterior surface of the rear part 22 of the second housing portion 14. In this embodiment, the rear part 22 does not provide an exterior surface of the portable apparatus 10 since a third housing portion is then provided to cover the battery.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising:
an interconnector solely configured to fasten a first housing portion and a second housing portion together, the interconnector comprising:
a first interconnector portion solely configured to fasten to a side part of a first housing portion of a portable apparatus, and
a second interconnector portion solely and rigidly connected to the first interconnector portion and configured to solely fasten to a second housing portion of the portable apparatus.

2. The apparatus as claimed in claim 1, wherein the first interconnector portion and the second interconnector portion are configured to fasten to the first and second housing portions substantially orthogonally relative to one another.

3. The apparatus as claimed in claim 1, wherein the interconnector is substantially planar.

4. The apparatus as claimed in claim 1, further comprising a printed wiring board, wherein the interconnector is positioned adjacent the printed wiring board and oriented substantially parallel to the printed wiring board.

5. The apparatus as claimed in claim 1, further comprising the first housing portion and the second housing portion, wherein the second interconnector portion is positioned substantially within a cavity defined by the first housing portion and the second housing portion.

6. The apparatus as claimed in claim 5, wherein the first interconnector portion is positioned substantially within the cavity defined by the first housing portion and the second housing portion.

7. The apparatus as claimed in claim 1, wherein the first interconnector portion is configured to receive a fastener for fastening to the side part of the first housing portion, and the second interconnector portion is configured to receive a fastener for fastening to the second housing portion.

8. The apparatus as claimed in claim 1, wherein the side part of the first housing portion defines an aperture and the second interconnector portion is configured to extend through the aperture and the first interconnector portion is configured to abut the side part of the first housing portion around the aperture.

9. The apparatus as claimed in claim 1, wherein the first housing portion and the second housing portion define an exterior surface of the portable apparatus.

10. A portable apparatus comprising the apparatus as claimed in claim 1.

11. An apparatus comprising:
an interconnector solely configured to fasten a first housing portion and a second housing portion together, the interconnector comprising:
means for solely fastening to a side part of a first housing portion of a portable apparatus, and
means for solely fastening to a second housing portion of the portable apparatus, the means for fastening to the first housing portion being rigidly connected to the means for fastening to the second housing portion.

12. The apparatus as claimed in claim 11, wherein the means for fastening to the first housing portion and the means for fastening to the second housing portion are configured to fasten to the first and second housing portions substantially orthogonally relative to one another.

13. A method comprising:
providing an interconnector solely configured to fasten a first housing portion and a second housing portion together, the interconnector comprising a first interconnector portion and a second interconnector portion, the second interconnector portion being rigidly connected to the first interconnector portion;
fastening the first interconnector portion solely to a side part of a first housing portion of a portable apparatus, and
fastening the second interconnector portion solely to a second housing portion of the portable apparatus.

14. The method as claimed in claim 13, wherein the first interconnector portion and the second interconnector portion are configured to fasten to the first and second housing portions substantially orthogonally relative to one another.

15. The method as claimed in claim 13, wherein the interconnector is substantially planar.

16. The method as claimed in claim 13, further comprising positioning the interconnector adjacent a printed wiring board and orienting the interconnector to be substantially parallel to the printed wiring board.

17. The method as claimed in claim 13, further comprising providing the first housing portion and the second housing portion, and wherein the second interconnector portion is positioned within a cavity defined by the first housing portion and the second housing portion.

18. The method as claimed in claim 17, wherein the first interconnector portion is positioned within the cavity defined by the first housing portion and the second housing portion.

19. The method as claimed in claim 13, further comprising configuring the first interconnector portion to receive a fastener for fastening to the side part of the first housing portion, and configuring the second interconnector portion to receive a fastener for fastening to the second housing portion.

20. The method as claimed in claim 13, wherein the side part of the first housing portion defines an aperture, and the method includes configuring the second interconnector portion to extend through the aperture and configured the first interconnector portion to abut the side part of the first housing portion around the aperture.

21. The method as claimed in claim 13, wherein the first housing portion and the second housing portion define an exterior surface of the portable apparatus.

* * * * *